US006939052B1

(12) United States Patent
Hull

(10) Patent No.: US 6,939,052 B1
(45) Date of Patent: Sep. 6, 2005

(54) BEARING WITH INTEGRATED MOUNTING FEATURES

(75) Inventor: David Warren Hull, Charlotte, NC (US)

(73) Assignee: Precision Components, Inc., Charlotte, NC (US)

( * ) Notice: Subject to any disclaimer, the term of this patent is extended or adjusted under 35 U.S.C. 154(b) by 34 days.

(21) Appl. No.: 10/352,316

(22) Filed: Jan. 27, 2003

(51) Int. Cl.[7] .............................................. F16C 27/00
(52) U.S. Cl. ...................................... 384/535; 384/536
(58) Field of Search ................................ 384/535, 537, 384/536, 581, 582, 585, 584

(56) References Cited

U.S. PATENT DOCUMENTS

| | | | |
|---|---|---|---|
| 2,283,839 A | * | 5/1942 | Wright ........................ 384/536 |
| 2,700,581 A | | 1/1955 | Migny |
| 3,004,803 A | | 10/1961 | Irwin |
| 3,053,591 A | * | 9/1962 | Bensch ........................ 384/581 |
| 3,061,386 A | | 10/1962 | Dix et al. |
| 3,302,987 A | | 2/1967 | Hoffmann et al. |
| 3,372,963 A | * | 3/1968 | Harris ......................... 384/537 |
| 3,512,855 A | | 5/1970 | Robinson |
| 3,512,856 A | | 5/1970 | Robinson |
| 3,513,480 A | | 5/1970 | Robinson |
| 4,089,570 A | * | 5/1978 | Markfelder et al. ......... 384/510 |
| 4,710,037 A | * | 12/1987 | Newberg ..................... 384/537 |
| 4,872,767 A | | 10/1989 | Knapp .......................... 384/99 |
| 4,938,614 A | | 7/1990 | Imamura et al. ............. 384/537 |
| 5,028,152 A | * | 7/1991 | Hill et al. .................... 384/557 |
| 6,056,445 A | | 5/2000 | Ueno et al. .................. 384/492 |
| 6,224,533 B1 | | 5/2001 | Bengtsson et al. ............ 494/82 |
| 6,280,095 B1 | * | 8/2001 | Furukoshi et al. .......... 384/489 |
| 6,379,051 B1 | | 4/2002 | Horn et al. .................. 384/569 |
| 2002/0039461 A1 | * | 4/2002 | Obara et al. ................. 384/535 |
| 2003/0012472 A1 | * | 1/2003 | Pilone et al. ................ 384/537 |

FOREIGN PATENT DOCUMENTS

| | | |
|---|---|---|
| JP | 63-13916 | 1/1988 |
| JP | 63-225717 | 9/1988 |
| JP | 6-159375 | 6/1994 |

* cited by examiner

*Primary Examiner*—Thomas R. Hannon
(74) *Attorney, Agent, or Firm*—James M. Harrington, P.A.

(57) ABSTRACT

A bearing with integrated mounting features is provided with a groove in at least one of the races thereof. The groove is of a shallow depth and provides a mounting location for a mounting ring of slightly different diameter than the race so as to permit the mounting and maintenance of the mounting ring by compression or interference upon the bearing, particularly during shipping and assembly. Consequently, the bearing may be preassembled even when the use of metal mounting rings is contemplated to accommodate manufacturing tolerances and conditions wherein slippage of the races is likely to occur.

17 Claims, 2 Drawing Sheets

BEARING WITH INTEGRATED MOUNTING FEATURES

FIELD OF THE INVENTION

The present invention relates generally to bearings and other round parts, and more particularly to a bearing or round component having an integrated mounting feature that permits easier, more effective use of a mounting ring to prevent slippage even in less than optimal mounting conditions.

BACKGROUND OF THE INVENTION

Bearings of the type contemplated by the art to which the present invention relates are typically utilized to reduce frictional forces operating at the interface between moving parts. A typical bearing design includes a concave-outward inner race mounted upon a shaft, a concave-inward outer race mounted within a housing concentrically about the inner race, and a number of lubricated round members, such as balls, cylinders, or cones, placed in the space between the inner and outer races. In such a design, the interface between parts moving relative to each other is reduced from a full face contact to a point or line contact, so the frictional forces are reduced based upon the difference between sliding friction (as with full face contact) and rolling friction.

One key to maintaining this reduction of friction at the interface is in preventing slippage, or relative movement between the inner race and the shaft, and the outer race and the housing. Indeed, slippage is one of the principal problems associated with proper bearing design and implementation, and its root cause is an insufficient frictional force between the races and their mating parts. A number of conditions contribute to slippage at the interface. For example, dissimilarities in the material of the bearing and the shaft or housing, and particularly dissimilarities in expansion rates between those materials, can cause imperfect contact between the races and their mating parts, reducing the friction therebetween and resulting in slippage. A second category of causes relates to manufacturing procedures; loose manufacturing tolerances, out-of-round conditions in the housing or the shaft, a lack of concentricity of the races and the housing or shaft, and other irregular conditions result in slippage (or other undesirable operating conditions) because the contact between the races and their mating parts is imperfect.

Irrespective of the cause, such undesirable operating conditions are intolerable primarily for two reasons. First, during operation of the device incorporating, for example, out-of-found or non-concentric conditions, vibration and noise are generated, frequently at undesirable levels. Such vibration and noise, being symptomatic of a failure to achieve the purpose to which bearings are directed, can result in premature failure of the borne parts. Second, slippage (and the heat generated by friction) will usually result in premature failure of the bearing, which in turn causes downtime for repair or, in more serious cases, catastrophic failure leading to machine damage or unsafe operating conditions.

The usual solution to slippage associated with material dissimilarities and loose tolerances is to interpose a mounting ring, which may include a locking device or some frictional material, between the race and its mating part. This ring is typically made of stamped, pressed, corrugated, rolled, cast, or machined metal, adhesive, or molded plastic or synthetic material, and is designed to fit by interference or compression between the race and its mating part. Ideally, the device is designed to accommodate, yet to be resilient against, a compressive force. Assuming that the fit is sufficiently tight to generate a holding force when the bearing and ring are inserted into or onto the mating part, the static friction between the race and the mating part is dramatically increased, and the potential for slippage is correspondingly reduced.

However, the conventional solution is lacking in that it potentially creates at least two additional manufacturing problems. First, the placement of a mounting ring upon the bearing or mating part requires an additional manufacturing step, because in order to be effective the mounting rings (particularly metal rings) are preferably sized too large to maintain themselves upon conventional bearings. Second, housings and shafts must be sized appropriately to accommodate additional material, and the addition of a mounting ring to a bearing design may increase overall design and manufacturing costs because the mating parts may have to be redesigned, or nonstandard bearing sizes may have to be used.

What is needed, therefore, is a bearing that may be preloaded with a mounting ring that effectively compensates for loose tolerances, misalignment, and differential expansion, and a bearing having substantially the same size profile and bearing capacity and characteristics as a standard bearing, but preloaded with a mounting ring.

SUMMARY OF THE PRESENT INVENTION

The aforementioned needs, and other needs, are met in the present invention, in which a conventional bearing is provided with one or more grooves in the inner or outer races, or both, which grooves are of a sufficient depth to permit one or more mounting rings of any of a wide variety of types to be mounted and maintained thereon, but not so deep that the bearing performance is compromised. Specifically, the groove is formed to provide a mounting surface for the mounting ring by providing a recess into which the mounting ring may be fitted, such that the mounting ring extends radially into the groove and radially outward from the groove.

In a further feature of the present invention, the groove is formed such that the race includes an annular shoulder against which the mounting ring rests, so as to prevent the mounting ring from axially disengaging from the bearing once the mounting ring has been fitted onto the bearing. Depending upon the configuration of the groove (for instance, as a double-walled groove, a notch, or a double groove) one or more additional annular shoulders may be provided so as to retain the mounting ring or rings upon the bearing.

In a further feature of the present invention, the groove is configured as a notch, and the mounting ring is optionally provided with a side profile that extends axially outward of the race and radially inward of the outer race or radially outward of the inner race. In this configuration, the mounting ring exerts both radial and axial retention forces upon the bearing, which serves to increase the ability of the bearing to be retained within the housing or upon a desired section of the shaft.

BRIEF DESCRIPTION OF THE DRAWINGS

Further features, embodiments, and advantages of the present invention will be apparent from the following detailed description with reference to the drawings, wherein.

DETAILED DESCRIPTION OF THE PREFERRED EMBODIMENTS

Figure 1:
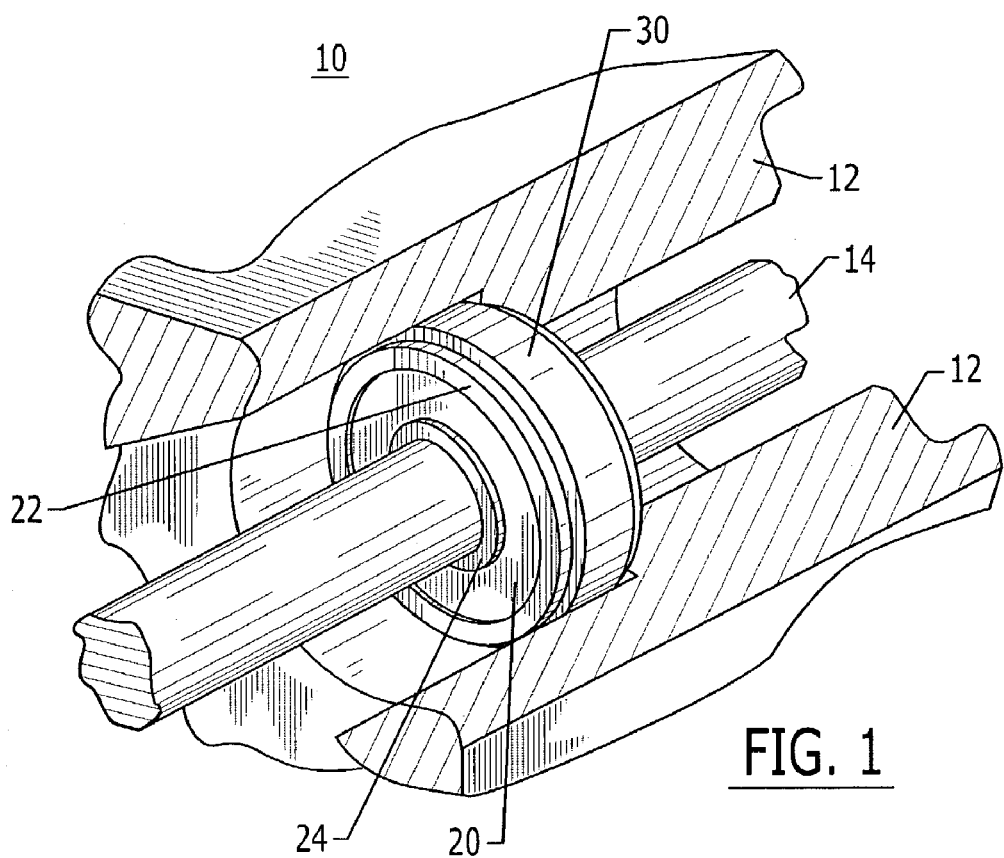
FIG. 1 is a general perspective view of a bearing system according to the present invention, shown with a portion of the housing broken away to illustrate interior detail.

Referring now to FIG. 1, a bearing system 10 according to the present invention is shown in a general perspective view. Bearing 20, the composition of which will be detailed below, is mounted within a housing 12, a portion of which housing 12 is broken away in order to illustrate the interior detail of the system. Housing 12 is provided with a shaft 14 which is sized appropriately to receive the whole of the bearing 20 in a press-fit assembly process. Housing 12 may represent a portion of any of a variety of machines or appliances in which a rotating shaft is needed (such as, by way of example and not to limit the scope of the present invention, an electric motor).

The bearing 20 is further mounted upon the shaft 14 by inserting the shaft 14 through the interior aperture of the bearing 20. The shaft 14 is designed to rotate with respect to housing 12, and in a preferred embodiment a load is borne by the bearing 20 and transferred, depending upon the loading conditions, to the shaft 14 or the housing 12. The bearing 20 is provided with a mounting ring 30, which is interposed between the outer race 22 of the bearing 20 and the housing 12. Mounting ring 30 is designed to accommodate a variety of imperfections in the contact between the bearing 20 and the housing 12, which may be caused by loose tolerances, misalignment, out-of-round conditions in the housing 12, differences in materials of the housing 12 and the bearing 20, or any other condition in which there is less than full-face contact between the bearing 20 and the housing 12.

In order for the bearing 20 to accomplish the primary task of reducing friction between the housing 12 and the shaft 14 as the shaft 14 rotates, the outer race 22 of the bearing 20 must remain as stationary as possible with respect to the housing 12, and the inner race 24 of the bearing 20 must remain as stationary as possible with respect to the shaft 14. A condition wherein there is relative movement between housing 12 and outer race 22, or between shaft 14 and inner race 24, would introduce slippage into the system, which in turn generates undesirable operating conditions (such as excess heat or noise) and potential damage to the system. Consequently, to prevent slippage, full-face and tight contact between each race 22, 24 and its mating part 12, 14 presents sufficient static friction to ensure that each race 22, 24 moves only relative to the other race and not to its own mating part 12, 14.

In FIG. 1, for convenience, only the mounting ring 30 between the outer race 22 and the housing 12 is shown, but it is equally possible to place a mounting ring between the inner race 24 and the shaft 14 for a comparably tight fit.

Figure 2:
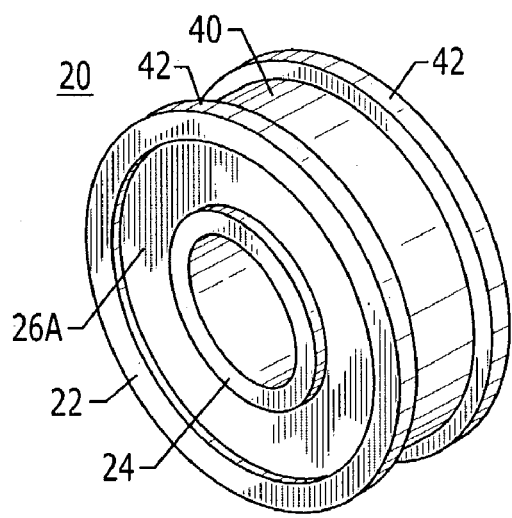
FIG. 2 is a perspective view of a bearing according to the present invention.
Figure 4A:
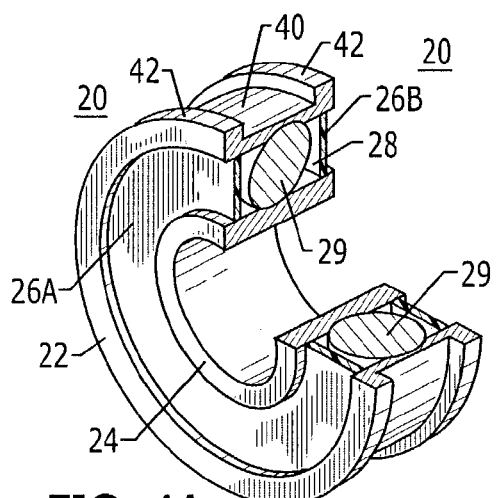
FIGS. 4A–4D are cross-sectional views of various embodiments of the present invention.

Referring now to FIG. 2, a bearing 20 according to the present invention is shown in greater detail. In FIG. 2, the bearing 20 is shown without any mounting ring 30 disposed upon it. The bearing 20 includes concentrically arranged outer and inner races 22, 24, with the space between them sealed by a sealing wall 26A. Referring for a moment to FIG. 4A, a second corresponding sealing wall 26B is present on the distal side of the bearing 20 to enclose an interior space 28. Within interior space 28 are a series of lubricated spherical bearing members or balls 29, sized to contact both races 22, 24 at a minimal contact point, so as to minimize friction between the balls 29 and the races 22, 24. Consequently, inner race 24 (and, correspondingly, shaft 14) is free to rotate with respect to outer race 22, with a greatly reduced frictional force therebetween, since the contact between the inner and outer races 24, 22 has been reduced to a rolling contact. Although FIG. 4A shows a configuration with spherical bearing members, it is possible, depending upon the desired application, to use cylindrical or conical members to achieve the desired result, particularly if greater loads are to be borne.

Referring again to FIG. 2, outer race 22 is provided with a groove 40 in the exterior thereof. The groove 40 is shown in an exaggerated relationship to the bearing itself in order to illustrate the detail more easily. The depth of groove 40 is ideally very small with respect to the thickness of the outer race 22, so as not to compromise the structural integrity of the bearing 20. Specifically, one of the load-bearing principles of a bearing system is that the load is supported by the outer race 22 as a column, and the load is efficiently transferred to the bearing members 29, the inner race 24, and the shaft 14. If the groove 40 is too deep, then the outer race 22 becomes a column, which permits the outer race 22 to flex in response to the load. While such a condition may increase the bearing capacity of the system, it would also create a point at which the distance between the outer and inner races 22, 24 is different from the thickness of the bearing members 29. Such a condition would undoubtedly result in the far-premature failure of the bearing, either by cracking of the bearing-side face of one of the races 22, 24, or crushing of one of the bearing members 29.

Figure 3:
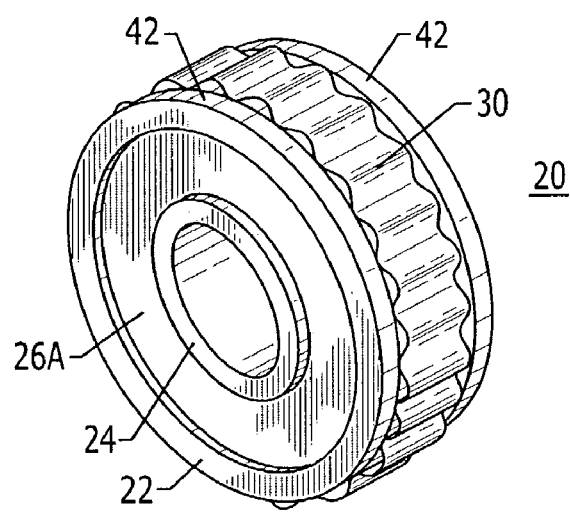
FIG. 3 is a perspective view as in FIG. 2, but with a mounting ring mounted on the bearing.

Referring now to FIGS. 2 and 3, the groove 40 in a preferred embodiment forms a pair of annular shoulders 42, which serve as retaining limits for the mounting ring 30. Mounting ring 30 is preferably sized so that once mounting ring 30 is placed upon the bearing 20, it is not easily dislodged therefrom, because it is contained between the annular shoulders 42, within the groove 40. Mounting ring 30 is further designed to protrude both above and below a line defined by the outermost edge of the outer race 22. In FIG. 3, mounting ring 30 is embodied as a ring of corrugated metal and when the bearing 20 and mounting ring 30 are press-fitted into the housing 12, the compression of the mounting ring 30 serves to exert a holding force upon the outer race 22 against the housing 12, thereby increasing the static frictional force therebetween and substantially preventing slippage of the bearing within the housing.

It should be noted that although an outer-race mounting ring 30 and groove 40 are depicted in FIGS. 2–3, a wide variety of configurations of the mounting ring 30 and groove 40 are possible, in which grooves 40 are placed within the outer race 22, the inner race 24, or both; in which two or more grooves 40 are provided in the same race 22, 24; in which the groove 40 is disposed along a side of one of the races as a notch; in which multiple mounting rings 30 are provided; or in which the mounting ring or rings 30 are made of a different material or are constructed differently. These variations all fall within the scope of the present invention, and one configuration or another may be useful for a particular application.

Figure 4B:
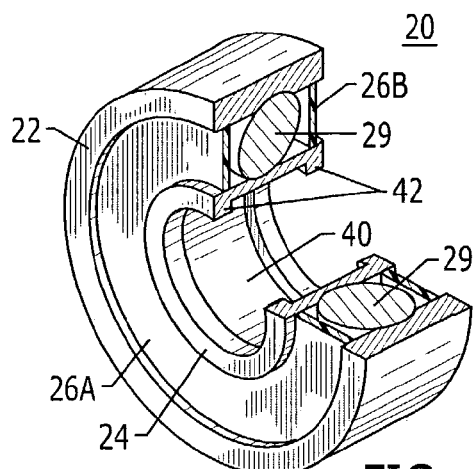

Referring now to FIGS. 4A–4D, some representative variations are depicted as alternative embodiments of the present invention. In each figure, a bearing 20 of the type depicted in FIGS. 2 and 3 is shown in partial cross-section in order to highlight the variations in the configuration of the races 22, 24 and the mounting rings 30. In each of the figures, the grooves 40 are depicted in exaggerated form for the ease of identification of the features of the present invention, as noted above. In FIG. 4A, the bearing shown is of substantially the same configuration as is depicted in FIG. 2 and is shown without a mounting ring in place. The groove 40 in the outer race 22 provides a mounting location for a mounting ring such that a mounting ring of slightly smaller interior diameter than the diameter of the outer race 22 may be placed upon the outer race 22. Correspondingly, as shown in FIG. 4B, the groove 40 in the inner race 24 provides a mounting location for a mounting ring, such that a mounting ring of slightly larger exterior diameter than the interior diameter of the inner race 24 could be placed within the groove 40. In the bearing shown in both FIGS. 4A and 4B, any such mounting ring, as it has a slightly different diameter from the race to which it is mounted, will be maintained within the groove 40.

Figure 4C:
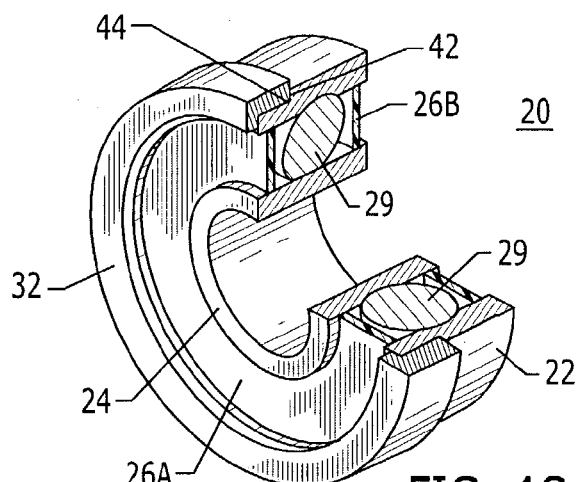

Referring now to FIG. 4C, an alternative embodiment of the present invention is shown. A bearing substantially the same as that shown in FIG. 2 is provided with an edge groove or notch 42, instead of a central groove 40 (see FIG. 2). The use of a notch 42 permits an edge ring 32 to be used in place of the usual mounting ring 30. In a preferred embodiment of the present invention, the edge ring 32 is provided with a side member that effects both radial and axial compressive loads. Such a configuration further increases the mounting and retention force exerted upon the race 22 to prevent slippage, and provides an axial spring location to induce axial loads to preload the bearing 20.

Figure 4D:
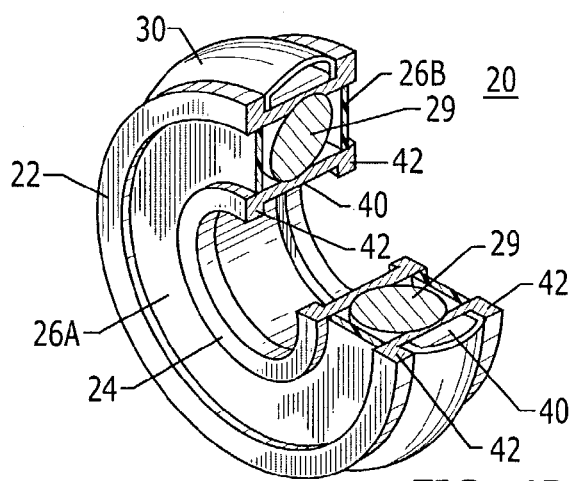

Referring now to FIG. 4D, an alternative embodiment of the present invention is shown. A bearing substantially the same as that shown in FIG. 2 is provided with a central groove 40 in both inner and outer races 24, 22, to provide a mounting location for mounting rings 30 at both interfaces. In FIG. 4D, the mounting ring is embodied as a crowned ring that compresses radially to provide retention forces both axially and radially.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

I claim:

1. An integrated mounting system for mounting an annular bearing in substantially slip-free relation upon a radial mounting location, comprising:

a groove disposed in a race of the bearing and having a groove width narrower than an axial width of the race; and a separately formed mounting ring disposed within the groove, the mounting ring having an uncompressed diameter sufficient when compressed to induce static frictional force against the mounting location to maintain the bearing upon the mounting location in substantially slip-free condition by compression fit in conditions of loose manufacturing tolerances, and the mounting ring having an axial width not greater than the groove width;

wherein the groove is configured to maintain the mounting ring upon the race.

2. The mounting system of claim 1, wherein the groove comprises a central groove bounded by a pair of annular shoulders for confining the mounting ring within the groove.

3. The mounting system of claim 1, wherein the groove comprises an edge groove disposed along an edge of the race and bounded by an annular shoulder for confining the mounting ring within the groove.

4. The mounting system of claim 1, wherein the mounting ring comprises a metal mounting ring.

5. The mounting system of claim 4, wherein the mounting ring is a corrugated metal mounting ring.

6. The mounting system of claim 1, wherein the mounting ring comprises molded plastic.

7. The mounting system of claim 1, further comprising:
a second groove disposed in the race; and
a second mounting ring disposed within the groove.

8. A bearing and an integrated mounting system therefor, comprising:

a pair of races, at least one of which is provided with a groove therein, the groove forming at least one annular shoulder and having a groove width narrower than an axial width of the at least one race;

a plurality of substantially frictionless load bearing members;

a lubricant; and a mounting ring disposed within the grooved race and maintained within the groove by the at least one annular shoulder, the mounting ring having an uncompressed diameter sufficient when compressed to induce static frictional force against a radial mounting location to maintain the bearing upon the mounting location in substantially slip-free condition by compression fit in conditions of loose manufacturing tolerances, and the mounting ring having an axial width not greater than the groove width;

wherein the groove maintains the mounting ring on the race and the mounting ring maintains the race in substantially slip-free relation to a mounting location by compression fit.

9. The bearing and system of claim 8, wherein each of the pair of races is provided with a groove therein, and a second mounting ring is disposed within the other groove.

10. The bearing and system of claim 8, wherein the groove is a central groove.

11. The bearing and system of claim 8, wherein the groove is an edge groove.

12. The bearing and system of claim 8, wherein the groove is a double groove.

13. The bearing and system of claim 12, further comprising a second mounting ring disposed within the double groove.

14. An integrated mounting system for mounting an annular bearing in substantially slip-free relation upon a radial mounting location, comprising:
  a groove disposed in a race of the bearing and having a groove width narrower than an axial width of the race; and
  a separately formed mounting ring disposed at least partially within the groove, the mounting ring having an uncompressed diameter sufficient when compressed to induce static frictional force against the mounting location to maintain the bearing upon the mounting location in substantially slip-free condition by compression fit in conditions of loose manufacturing tolerances, and the part of the mounting ring disposed within the groove having an axial width not greater than the groove width;
  wherein the groove is configured to maintain the mounting ring upon the race.

15. The mounting system of claim 14, wherein the groove is an edge groove bounded by a single shoulder, and the mounting ring is provided with a side member extending outside an axial profile of the race for providing an axial load upon the bearing.

16. The mounting system of claim 15, wherein the race is an outer race and the side member extends inward of a radial profile of the groove.

17. The mounting system of claim 15, wherein the race is an inner race and the side member extends outward of a radial profile of the groove.

* * * * *

(12) INTER PARTES REEXAMINATION CERTIFICATE (0253rd)
United States Patent
Hull

(10) Number: US 6,939,052 C1
(45) Certificate Issued: Mar. 22, 2011

(54) BEARING WITH INTEGRATED MOUNTING FEATURES

(75) Inventor: David Warren Hull, Charlotte, NC (US)

(73) Assignee: Precision Components, Inc., Charlotte, NC (US)

Reexamination Request:
No. 95/001,009, Oct. 11, 2007

Reexamination Certificate for:
Patent No.: 6,939,052
Issued: Sep. 6, 2005
Appl. No.: 10/352,316
Filed: Jan. 27, 2003

(51) Int. Cl.
  *F16C 27/04* (2006.01)
  *F16C 25/00* (2006.01)
  *F16C 35/04* (2006.01)
  *F16C 27/00* (2006.01)
  *F16C 25/08* (2006.01)
  *F16C 17/00* (2006.01)

(52) U.S. Cl. .......................................... 384/535; 384/536
(58) Field of Classification Search .................. None
See application file for complete search history.

(56) References Cited

U.S. PATENT DOCUMENTS

| | | |
|---|---|---|
| 2,897,026 A | 7/1959 | Hellier et al. |
| 4,938,614 A | 7/1990 | Imamura et al. |
| 5,028,152 A | 7/1991 | Hill et al. |
| 5,125,755 A | 6/1992 | Adler et al. |
| 5,931,585 A | 8/1999 | Malchow et al. |
| 6,288,879 B1 | 9/2001 | Misso et al. |
| 6,517,251 B1 * | 2/2003 | Williams ..................... 384/536 |

OTHER PUBLICATIONS

"race." Merriam–Webster Online Dictionary. 2008. Merriam–Webster Online. May 27, 2008. <http://www.merriam-webster.com/dictionary/race>.*
"race." The American Heritage® Dictionary of the English Language, Fourth Edition. Houghton Mifflin Company, 2004. May 27, 2008. Dictionary.com: <http://dictionary.reference.com/browse/race>.*
Rencol Tolerance Rings –Retrieved online Sep. 27, 2007 from Wyko website using Internet URL: http://www.wyko.co.uk/tolerance_rings/index.asp.

* cited by examiner

*Primary Examiner*—Peter C. English

(57) ABSTRACT

A bearing with integrated mounting features is provided with a groove in at least one of the races thereof. The groove is of a shallow depth and provides a mounting location for a mounting ring of slightly different diameter than the race so as to permit the mounting and maintenance of the mounting ring by compression or interference upon the bearing, particularly during shipping and assembly. Consequently, the bearing may be preassembled even when the use of metal mounting rings is contemplated to accommodate manufacturing tolerances and conditions wherein slippage of the races is likely to occur.

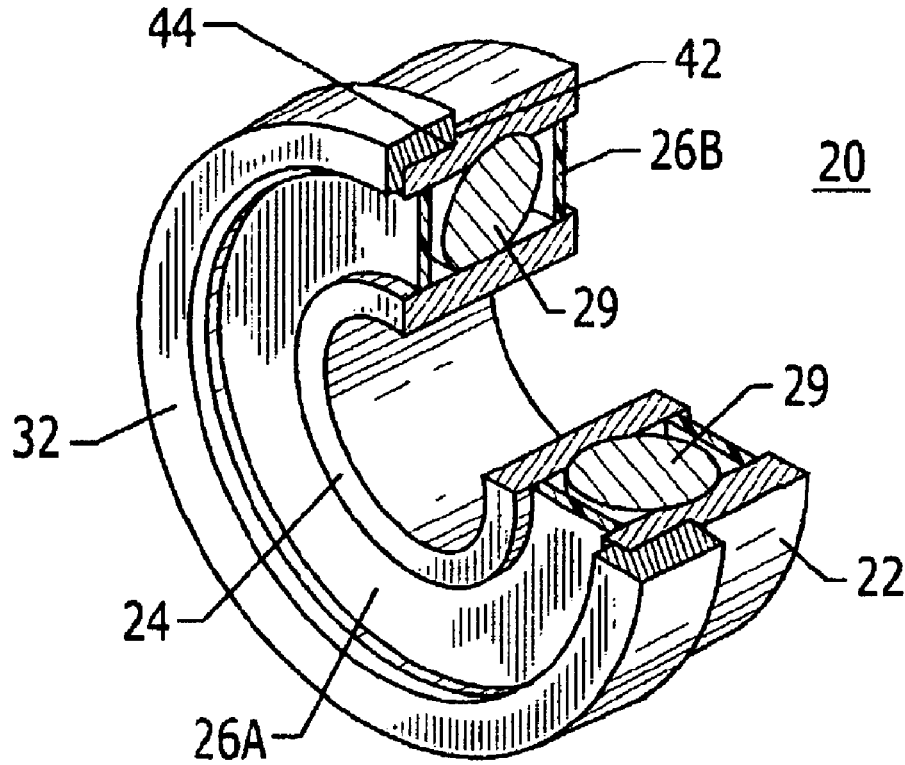

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 3, 11 and 15-17 is confirmed.

Claims 1, 2, 4-10 and 12-14 are cancelled.

\* \* \* \* \*